(12) United States Patent
Hatayama et al.

(10) Patent No.: US 6,633,698 B2
(45) Date of Patent: Oct. 14, 2003

(54) OPTICAL FILTER

(75) Inventors: Hitoshi Hatayama, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 104 days.

(21) Appl. No.: 09/840,929

(22) Filed: Apr. 25, 2001

(65) Prior Publication Data

US 2001/0036005 A1 Nov. 1, 2001

(30) Foreign Application Priority Data

Apr. 26, 2000 (JP) ................................. P2000-126130
Aug. 4, 2000 (JP) ................................. P2000-237363

(51) Int. Cl.⁷ ................................................ G02B 6/26
(52) U.S. Cl. ........................................ 385/27; 385/39
(58) Field of Search ........................... 385/27, 15, 24, 385/39, 42; 359/337.1, 337.13

(56) References Cited

U.S. PATENT DOCUMENTS

| 5,596,661 | A | | 1/1997 | Henry et al. .................. 385/24 |
| 6,285,810 | B1 | * | 9/2001 | Fincato et al. ................ 385/24 |
| 6,333,807 | B1 | * | 12/2001 | Hatayama et al. ............ 385/39 |
| 6,560,381 | B2 | * | 5/2003 | Hatayama et al. ............ 385/15 |

FOREIGN PATENT DOCUMENTS

| EP | 0 382 461 A2 | 8/1990 |
| EP | 0 926 532 A2 | 6/1999 |
| EP | 1 041 424 A2 | 10/2000 |

OTHER PUBLICATIONS

K. Jinguji et al. Optical Half–Band Filters. Journal of Lightwave Technology, vol. 18, No. 2, pp. 252–259. Feb. 2000.*

K. Jinguji et al. Two–Port Optical Wavelength Circuits Composed of Cascaded Mach–Zehnder Interferometers with Point–Symmetrical Configurations. Journal of Lightwave Technology, vol.14, No. 10, pp. 2301–2310. Oct. 1996.*

K. Inoue, et al., "Tunable Gain Equalization using a Mach–Zehnder Optical Filter in Multistage Fiber Amplifiers," IEEE Photonics Technology Letters, vol. 3, No. 8, pp. 718–720 ( Aug. 1991).

G.H.B. Thompson, et al., "Planar Waveguide Filters for Dynamic Equalisation of EDFA Spectra," ECOC'99, pp. 1–320–321 (Sep. 1999).

Higher Order Dispersion Equaliser of Dispersion Shifted Fibre Using A Lattice–Form Programmable Optical Fiber, Takiguchi, et al., Electronics Letters, IEE Stevenage, GB, vol. 32, No. 8, Apr. 11, 1996.

* cited by examiner

*Primary Examiner*—Rodney Bovernick
*Assistant Examiner*—Michael J. Stahl
(74) *Attorney, Agent, or Firm*—McDermott, Will & Emery

(57) ABSTRACT

A main optical path disposed between light input and output ends and an auxiliary optical path disposed so as to correspond to the main optical path are optically coupled to each other with first, second, and third optical couplers. The respective optical path lengths of main and auxiliary optical paths differ from each other between the first and second optical couplers and between the second and third optical couplers. Between the first and second optical couplers and between the second and third optical couplers, at least one of the main and auxiliary optical paths is provided with temperature adjusting means for adjusting the temperature of the corresponding optical path.

5 Claims, 14 Drawing Sheets

OPTICAL FILTER

BACKGROUND OF THE INVENTION

1. Field of the Invention

The present invention relates to an optical filter which is suitably employable as a gain equalizer for equalizing the gain of optical amplification of signal light, or the like in an optical amplifier.

2. Related Background Art

An optical amplifier includes an optical waveguide, doped with a fluorescent material excitable with pumping light, for optically amplifying signal light; and pumping means for supplying pumping light to the optical waveguide. Such an optical amplifier is provided in a repeating station in an optical transmission system, or the like. In particular, it is important for the optical amplifier employed in a wavelength division multiplexing transmission system for transmitting signal light of a plurality of channels to optically amplify the plurality of channels in a collective manner at respective gains equal to each other, and to output each channel of signal light with a power held at a constant target value. Hence, for equalizing the optical amplification of signal light in such an optical amplifier, an optical filter having a loss spectrum in a form similar to that of the gain spectrum in the amplifying optical waveguide is used as a gain equalizer.

For example, literature 1—K. Inoue, et al., "Tunable Gain Equalization Using a Mach-Zehnder Optical Filter in Multistage Fiber Amplifiers," IEEE Photonics Technology Letters, Vol. 3, No. 8, pp. 718–720 (1991)—and literature 2—G. H. B. Thompson, et al., "Planar Waveguide Filters for Dynamic Equalization of EDFA Spectra," ECOC'99 (1999)—disclose techniques for flattening the gain of an optical amplifier by means of an optical filter using a Mach-Zehnder interferometer. The techniques disclosed in these literatures aim at adjusting the respective temperatures of individual optical couplers and individual branching optical paths in a Mach-Zehnder interferometer according to the input signal light power, so as to regulate the slope of transmission loss to wavelengths in optical filter, thereby compensating for the fluctuation in the slope of gain to wavelengths accompanying the fluctuation in input signal light power.

SUMMARY OF THE INVENTION

In the above-mentioned conventional techniques, if the power of signal light outputted from the optical amplifier is to be kept constant when the loss in an optical transmission line in front of the optical amplifier fluctuates due to some reason and thereby the signal light fed into the optical amplifier alters its power, it will be necessary for the optical amplification of signal light in the optical amplifier to change its gain. When the gain is changed, the wavelength dependence of gain, i.e., the slope of gain to wavelengths (gain slope), may fluctuate, thereby deteriorating the gain flatness of optical amplifier, which causes the respective powers of a plurality of channels of signal light outputted from the optical amplifier to deviate from each other. Therefore, the respective temperatures of individual optical couplers and branching optical paths in each Mach-Zehnder interferometer constituting the optical filter are adjusted according to the input signal light power, so as to adjust the slope of loss to wavelengths (loss slope) in optical filter, thereby compensating for the fluctuation in gain slope accompanying the fluctuation in gain slope. When the loss slope in optical filter is changed according to the input signal light power, however, the loss level in the signal light wavelength band may fluctuate, whereby the signal light outputted from the optical amplifier after being optically amplified may fluctuate and deteriorate its S/N ratio. Also, the number of heaters provided for adjusting the loss slope in this optical filter is 3 or 6, which is so large that the control of loss slope is complicated.

In order to overcome the problems mentioned above, it is an object of the present invention to provide an optical filter which is suitably employable as a gain equalizer or the like in an optical amplifier, whereas its loss slope is easy to control.

For achieving the above-mentioned object, the optical filter in accordance with the present invention comprises: (1) a main optical path for guiding light from an input end to an output end; (2) an auxiliary optical path, optically coupled to the main optical path with first, second, and third optical couplers, wherein the optical path length between said first and second optical couplers and an optical path length between said second and third optical couplers are different from the main optical path; (3) first temperature adjusting means, disposed in at least one of the main and auxiliary optical paths between the first and second optical couplers, for adjusting the temperature of the main and/or auxiliary optical paths; and (4) second temperature adjusting means, disposed in at least one of the main and auxiliary optical paths between the second and third optical couplers, for adjusting the temperature of the main and/or auxiliary optical paths.

In the optical filter in accordance with the present invention, the main and auxiliary optical paths and the first and second optical couplers constitute a first Mach-Zehnder interferometer, the main and auxiliary optical paths have respective optical path lengths different from each other between the first and second optical couplers, and the temperature of one or both of the optical paths is regulated by the first temperature adjusting means. Further, the main and auxiliary optical paths and the second and third optical couplers constitute a second Mach-Zehnder interferometer, the main and auxiliary optical paths have respective optical path lengths different from each other between the second and third optical couplers, and the temperature of one or both of the optical paths is regulated by the second temperature adjusting means. The temperature adjustment effected by each of the first and second temperature adjusting means makes it possible to set the slope of loss to wavelengths in a given wavelength band. Thus, this optical filter has a simple configuration and is easy to control the loss slope, whereby it can suitably be used as a gain equalizer in an optical amplifier, or the like, for example.

When the first and second temperature adjusting means are disposed in one of the main and auxiliary optical paths alone, it will be sufficient if only two pieces of heaters, Peltier devices, and the like employable as temperature adjusting means are provided, whereby it becomes further easier to control the loss slope.

Preferably, the optical filter further comprises control means for controlling the first and second temperature adjusting means so as to set a slope of transmission loss across the main optical path to wavelengths in a given wavelength band.

Preferably, between the first and second optical couplers and between the second and third optical couplers, the optical path length differences between the main and auxiliary optical paths are not longer than 42 $\mu$m. This configuration is suitable for setting the loss slope deviation from a given straight line to 1 dB or less.

Preferably, the transmission loss characteristics across the main optical path may be substantially independent of wavelength in a given wavelength band by adjusting the first and second temperature adjusting means.

The optical filter in accordance with the present invention may be configured such that the bandwidth of the given wavelength band is 25 nm or wider, the absolute value of the slope of transmission loss across the main optical path to wavelengths in the given wavelength is variable at least within the range of 0 to 5 dB/125 nm, a deviation from a given straight line is 1 dB or less, and the minimum value of the transmission loss across the main optical path in the given wavelength band is 2 dB or less. Alternatively, it may be configured such that the bandwidth of the given wavelength band is 36 nm or wider, the absolute value of the slope of transmission loss across the main optical path to wavelengths in the given wavelength is variable at least within the range of 0 to 5 dB/36 nm, a deviation from a given straight line is 1 dB or less, and the minimum value of the transmission loss across the main optical path in the given wavelength band is 2 dB or less. In these cases, the optical filter maintains sufficient linearity and sufficiently low loss, while the loss slope is variable in a sufficient range, in the wavelength band from 1535 nm to 1565 nm, which is a signal light wavelength band, for example.

DESCRIPTION OF THE PREFERRED EMBODIMENTS

Figure 1:
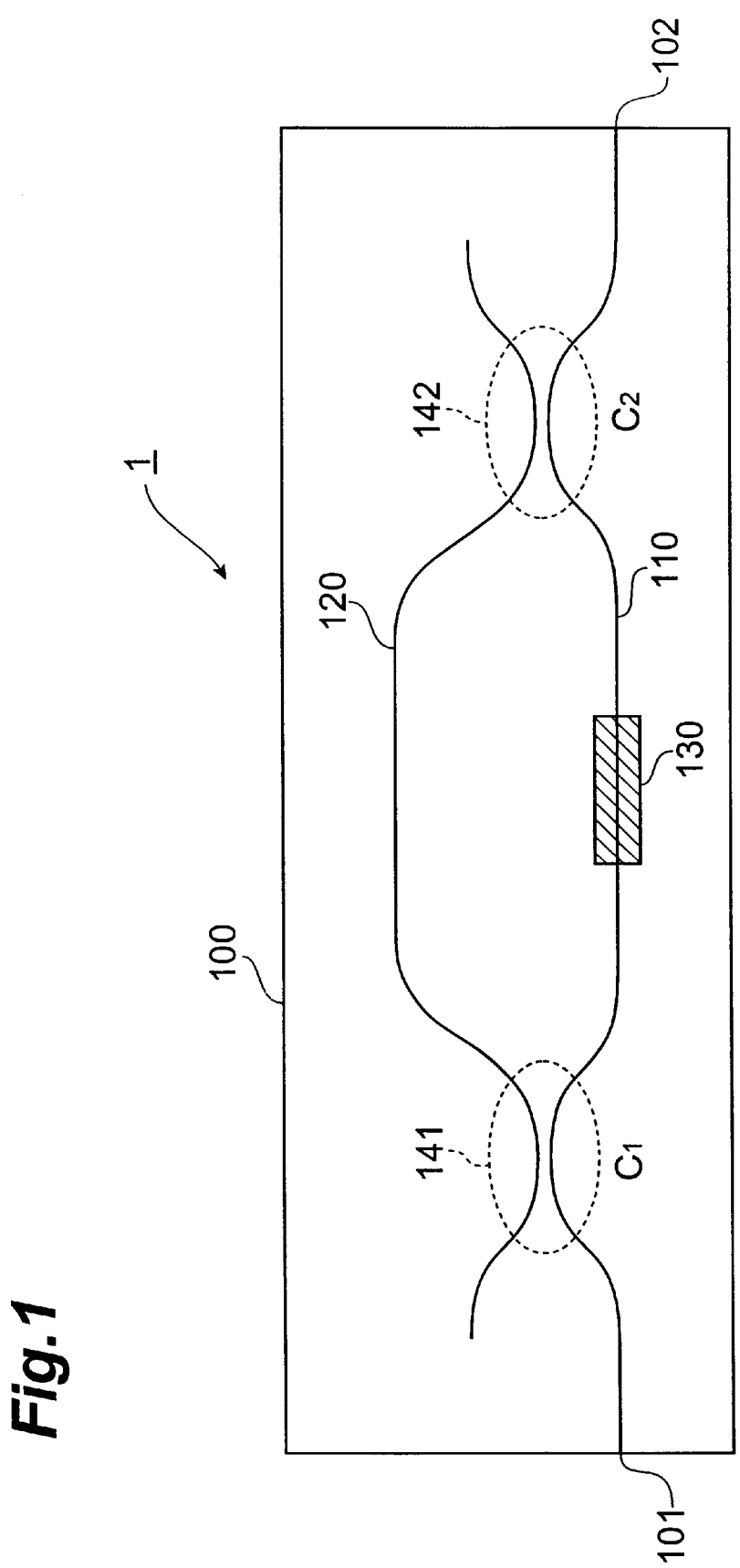
FIG. 1 is a diagram of the optical filter in accordance with a basic embodiment.

In the following, embodiments of the present invention will be explained in detail with reference to the accompanying drawings. To facilitate the comprehension of the explanation, the same reference numerals denote the same parts, where possible, throughout the drawings, and a repeated explanation will be omitted.

Basic Embodiment

First, before explaining embodiments of the optical filter in accordance with the present invention, a basic embodiment of an optical filter utilizing a Mach-Zehnder interferometer will be explained. FIG. 1 is a diagram of an optical filter 1 constituting this basic embodiment. This optical filter 1 is an optical planar waveguide type circuit formed on a substrate 100; and comprises a main optical path 110, an auxiliary optical path 120, and a heater (temperature adjusting means) 130.

The main optical path 110 is an optical path disposed between a light input end 101 located at one end face of the substrate 100 and a light output end 102 located at the other end face thereof. A first optical coupler 141 and a second optical coupler 142 are successively disposed from the light input end 101 to the light output end 102. The main optical path 110 and auxiliary optical path 120 are optically coupled to each other at the first optical coupler 141 and second optical coupler 142. The main optical path 110, auxiliary optical path 120, first optical coupler 141, and second optical coupler 142 constitute a Mach-Zehnder interferometer.

The heater 130 is disposed on the main optical path 110 between the first optical coupler 141 and second optical coupler 142. The heater 130 adjusts the temperature of main optical path 110, so as to regulate the phase shift amount $\Delta\phi$ of main optical path 110, thereby controlling the loss in light between the light input end 101 and light output end 102.

The transmission spectrum $T(\lambda)$ with respect to the light inputted to the light input end 101 and then outputted from the light output end 102 by way of the main optical path 110 is represented by the expression:

$$T(\lambda)=1-C_1-C_2+2C_1C_2-2\sqrt{C_1C_2(C_1-1)(C_2-1)}\cos[(2\pi n_c/\lambda)\Delta L-\Delta\phi] \quad (1)$$

where $\lambda$ is the wavelength of light, $C_1$ is the power coupling ratio at the optical coupler 141, $C_2$ is the power coupling ratio at the optical coupler 142, $n_c$ is the effective refractive index of each of the main optical path 110 and auxiliary optical path 120, $\Delta L$ is the difference between the respective optical path lengths of the main optical path 110 and auxiliary optical path 120 between the optical couplers 141 and 142, and $\Delta\phi$ is the phase shift amount according to the temperature adjustment of main optical path 110 effected by the heater 130.

The following can be seen from the above-mentioned expression (1). Namely, the transmission spectrum $T(\lambda)$ of optical filter 1 periodically changes depending on the wavelength $\lambda$, whereas the wavelength period is shorter as the optical path length difference $\Delta L$ is greater. The wavelength $\lambda_0$ at which the transmissivity T is maximized (loss is minimized) can be controlled by adjusting the phase shift amount $\Delta\phi$. For example, if the optical path length difference $\Delta L$ is set appropriately, then the transmissivity T can be maximized (loss can be minimized) at a predetermined wavelength (1550 nm) within a predetermined wavelength band (wavelength of 1535 nm to 1565 nm) when the temperature adjustment effected by the heater 130 is at a predetermined level (i.e., when the phase shift amount $\Delta\phi$ is at a predetermined value). Also, the temperature adjustment effected by the heater 130 can set the slope of transmission loss to the wavelength $\lambda$ in the above-mentioned wavelength band.

Figure 2:
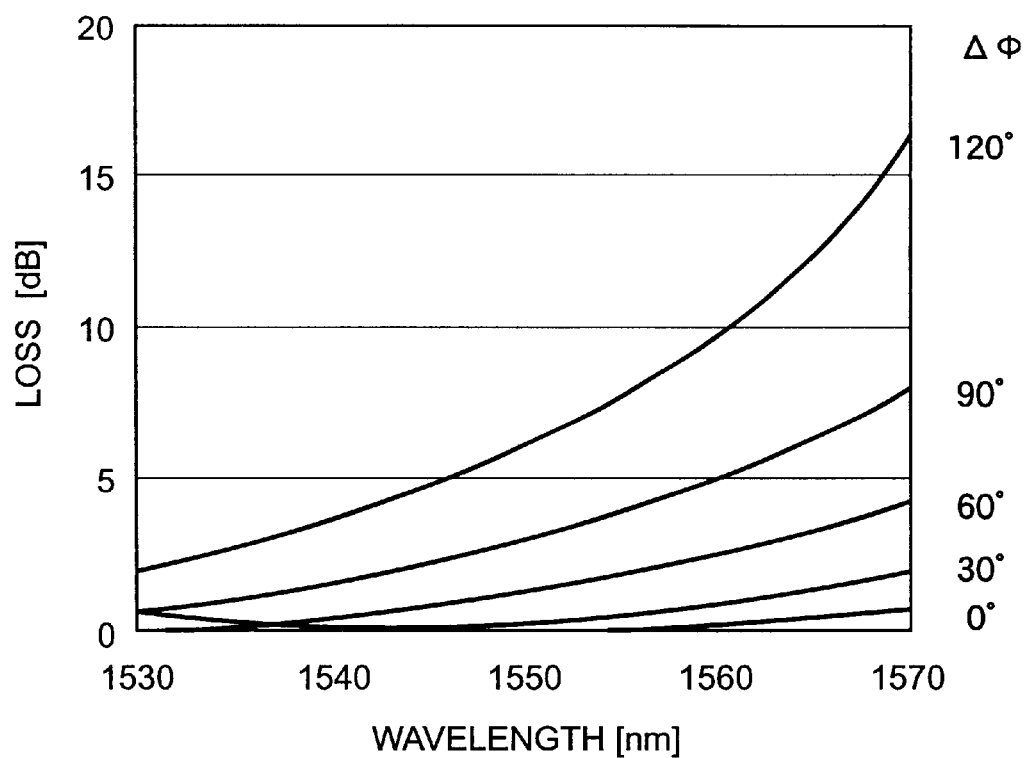
FIG. 2 is a graph showing wavelength characteristics of transmission loss across the optical filter shown in FIG. 1.

FIG. 2 is a graph showing wavelength characteristics of transmission loss in the optical filter 1 in accordance with the basic embodiment. Here, $C_1=C_2=0.5$, $n_c=1.45$, and $\Delta L$ is 6.95 $\mu$m. Further, the phase shift amount $\Delta\phi$ is set to 0°, 30°, 60°, 90°, and 120°. When no temperature adjustment is effected by the heater 130, i.e., the phase shift amount $\Delta\phi$ is set to 0°, as can be seen from the graph, the transmission loss across the optical filter 1 is minimized at a wavelength of 1550 nm and yields a low value within the wavelength range from 1530 nm to 1570 nm, whereby the slope of transmission loss to the wavelength $\lambda$ in the above-mentioned wavelength band is low. As the temperature of main optical path 110 is raised by the heater 130 (thereby increasing the phase shift amount $\Delta\phi$), the slope of transmission loss to the wavelength $\lambda$ in the above-mentioned wavelength band becomes greater. Here, the loss is minimized at a wavelength of 1535 nm on the shorter wavelength side. The optical filter 1 has such characteristics that the loss slope is variable within the range from 0 to 9.37 dB/30 nm when the phase shift amount $\Delta\phi$ is adjusted within the range from 0° to 120° within the wavelength range from 1535 nm to 1565 nm (with a bandwidth of 30 nm), the loss slope deviation from a given straight line is 1.55 dB or less, and the minimum value of transmission loss in the above-mentioned wavelength band is 2.84 dB.

When a Peltier device is provided in place of the heater 130 in the basic embodiment so as to raise or lower the temperature of main optical path 110, the value of phase shift amount $\Delta\phi$ can be set not only positive but also negative. If the value of phase shift amount $\Delta\phi$ is thus changed within the range from –120° to 0°, then the loss slope can be set within the range from –9.37 dB/30 nm to 0 dB/30 nm within the wavelength band from 1535 nm to 1565 nm, whereupon the transmission loss is minimized at a wavelength of 1565 nm on the longer wavelength side. Also, a heater or Peltier device may be disposed on the auxiliary optical path 120 instead of main optical path 110, or on each of the main optical path 110 and auxiliary optical path 120.

In the optical filter 1 in accordance with the basic embodiment, however, the loss slope deviation from a given straight line cannot always be considered sufficiently small, and the minimum value of transmission loss in the wavelength band in use cannot always be considered sufficiently low. This is because of the fact that the optical filter 1 having a structure such as that shown in FIG. 1 has such a tradeoff relationship between the linearity and low transmission loss that increasing the optical path length difference $\Delta L$ lowers the loss but deteriorates the linearity, whereas lowering the optical path length difference $\Delta L$ improves the linearity but increases the transmission loss. Hence, the configuration of optical filter 1 in accordance with this basic embodiment is hard to attain linearity and low transmission loss at the same time. The optical filter in accordance with the present invention realizes a configuration achieving linearity and low transmission loss at the same time, whose configuration will now be explained specifically.

First Embodiment

To begin with, a first embodiment of the optical filter in accordance with the present invention will be explained.

Figure 3:
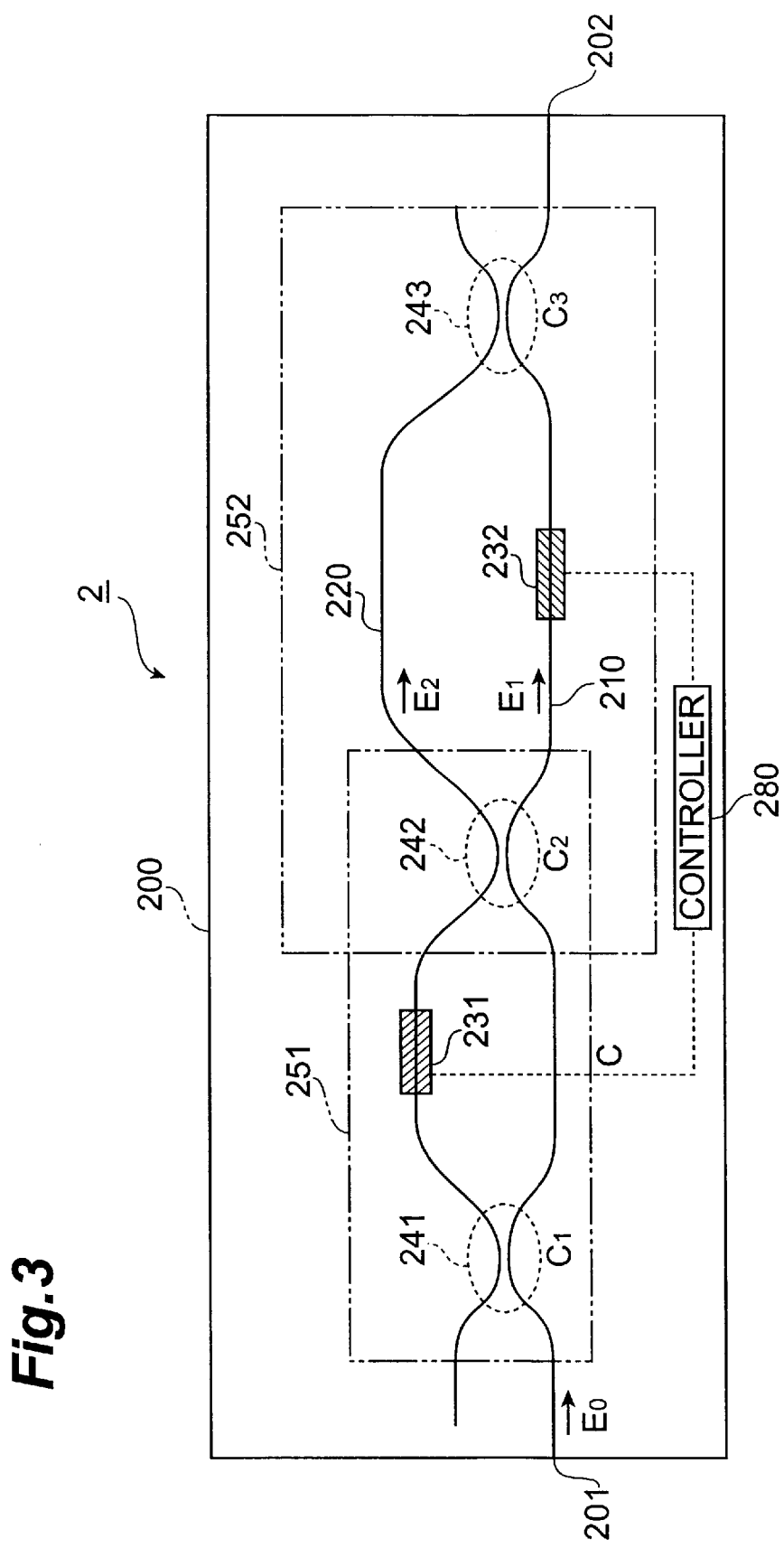
FIG. 3 is a diagram of a first embodiment of the optical filter in accordance with the present invention.

FIG. 3 is a diagram of an optical filter 2 in accordance with the first embodiment. The optical filter 2 in accordance with this embodiment is an optical planar waveguide type circuit formed on a substrate 200; and comprises a main optical path 210, an auxiliary optical path 220, a heater (first temperature adjusting means) 231, and a heater (second temperature adjusting means) 232, as well as a controller 280 for controlling operations of the heaters 231 and 232.

The main optical path 210 is an optical path disposed between a light input end 201 located at one end face of the substrate 200 and a light output end 202 located at the other end face thereof. A first optical coupler 241, a second optical coupler 242, and a third optical coupler 243 are successively disposed from the light input end 201 to the light output end 202. The main optical path 210 and auxiliary optical path 220 are optically coupled to each other at the first optical coupler 241, second optical coupler 242, and third optical coupler 243. The main optical path 210, auxiliary optical path 220, first optical coupler 241, and second optical coupler 242 constitute a first Mach-Zehnder interferometer 251. The main optical path 210, auxiliary optical path 220, second optical coupler 242, and third optical coupler 243 constitute a second Mach-Zehnder interferometer 252.

The heater 231 is disposed on the auxiliary optical path 220 between the first optical coupler 241 and second optical coupler 242; and, under instructions from the controller 280, adjusts the temperature of auxiliary optical path 220, thereby regulating the phase shift amount $\Delta\phi_1$ of auxiliary optical path 220. The heater 232 is disposed on the main optical path 210 between the second optical path 242 and third optical coupler 243; and, under instructions from the controller 280, adjusts the temperature of main optical path 210, thereby regulating the phase shift amount $\Delta\phi_2$ of main optical path 210. Namely, the controller 280 functions to regulate the transmission loss across the main optical path 210 by controlling operations of the heaters 231 and 232.

The transmission spectrum $T(\lambda)$ with respect to the light inputted to the light input end 201 and then outputted from the light output end 202 by way of the main optical path 210 is represented by the expression:

$$T(\lambda)=1-C-C_3+2CC_3-2\sqrt{CC_3(C-1)(C_3-1)}\cos[(2\pi n_c/\lambda)\Delta L_2-\Delta\phi_2] \quad (2)$$

where $\lambda$ is the wavelength of light, C is the power coupling ratio of the Mach-Zehnder interferometer 251 when assumed to be a single optical coupler and is represented by an expression similar to the above-mentioned expression (1), $C_3$ is the power coupling ratio at the optical coupler 243, $n_c$ is the effective refractive index of each of the main optical path 210 and auxiliary optical path 220, $\Delta L_2$ is the difference between the respective optical path lengths of the main optical path 210 and auxiliary optical path 220 between the optical couplers 242 and 243, and $\Delta\phi_2$ is the phase shift amount according to the temperature adjustment of main optical path 210 effected by the heater 232.

Namely, the configuration of the optical filter 2 in accordance with this embodiment is equivalent to that of the optical filter 1 of the above-mentioned basic embodiment when one optical coupler 141 is replaced by the Mach-Zehnder interferometer 251. In the optical filter 2, the power coupling ratio C of light in the Mach-Zehnder interferometer 251 is dependent on wavelength, whereas the wavelength dependence of power coupling efficiency C can be adjusted by the difference $\Delta L_1$ between the respective optical path lengths of the main optical path 210 and auxiliary optical path 220 between the optical couplers 241 and 242, and by the phase shift amount $\Delta\phi_1$ according to the temperature adjustment of auxiliary optical path 220 effected by the heater 231.

Figure 4:
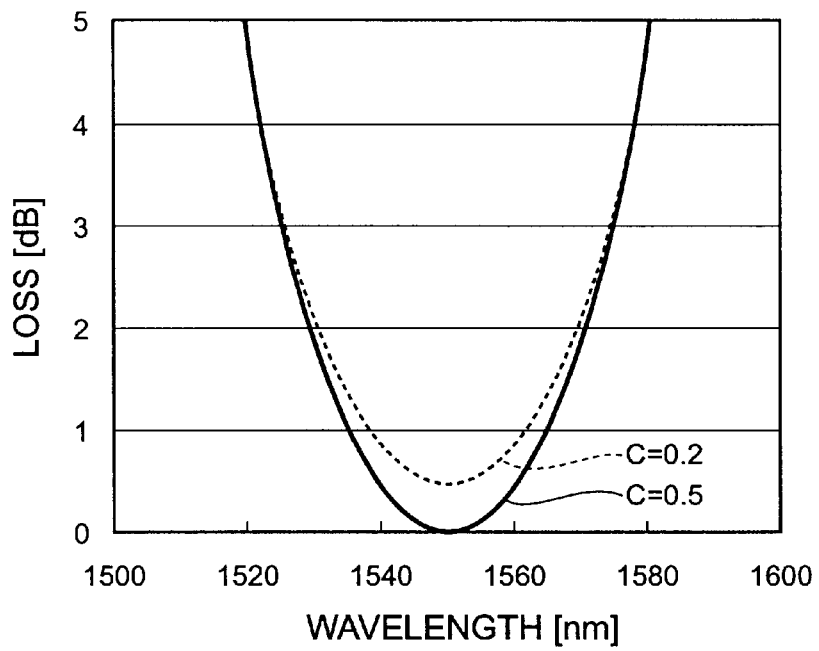
FIG. 4 is a graph showing wavelength characteristics of transmission loss across the optical filter shown in FIG. 3.

FIG. 4 is a graph showing wavelength characteristics of transmission loss in the optical filter 2 in accordance with this embodiment. Here, the power coupling ratio $C_3$ of light in the optical coupler 243 is 0.5, $n_c$=1.45, $\Delta L_2$=16.57 μm, and $\Delta\phi_1$=0°. Also, the power coupling ratio C in Mach-Zehnder interferometer 251 is set to 0.2 and 0.5. In the optical filter 2, as can be seen from this graph, the difference in loss between the respective cases where C=0.2 and C=0.5 becomes smaller as the wavelength is farther from 1550 nm, though a lower loss is attained near a wavelength of 1550 nm when C=0.5.

Figure 5:
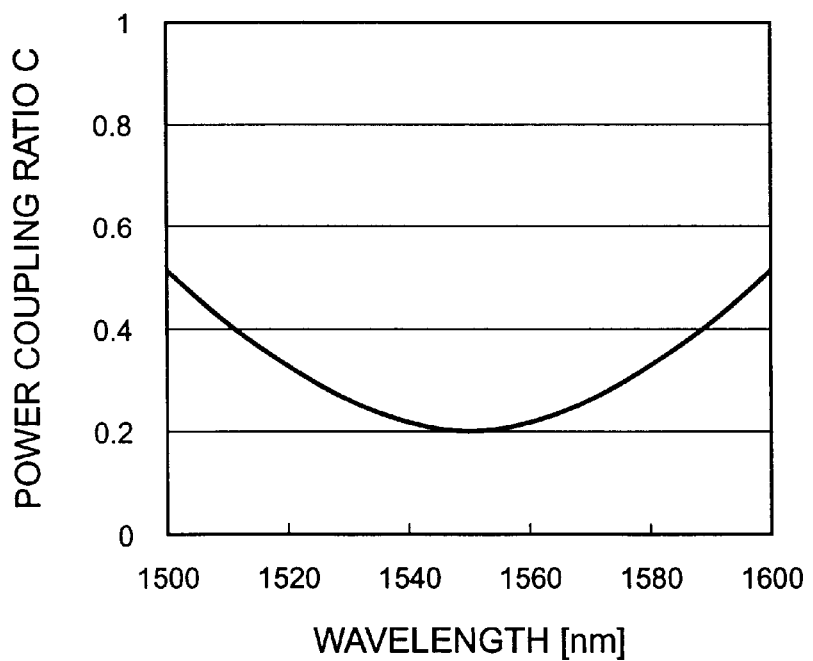
FIG. 5 is a graph showing a wavelength characteristic of power coupling ratio C in the first Mach-Zehnder interferometer in the optical filter of FIG. 3.

Hence, the power coupling ratio C of light in the Mach-Zehnder interferometer 251 is set so as to exhibit a wavelength dependence such as that shown in FIG. 5. Namely, the power coupling ratio C of light in the Mach-Zehnder interferometer 251 is minimized near a wavelength of 1550 nm and is made greater as the wavelength is farther therefrom. Since the respective optical path lengths of the main optical path 210 and auxiliary optical path 220 between the optical couplers 241 and 242 differ from each other, and the phase shift amount $\Delta\phi_1$ of auxiliary optical path 220 can be regulated when the temperature of auxiliary optical path 220 is adjusted by the heater 231, the power coupling ratio C of light in the Mach-Zehnder interferometer 251 can have such a wavelength dependence. Such setting makes it possible to attain the linearity in transmission loss and a low transmission loss across the optical filter 2 at the same time.

Figure 6:
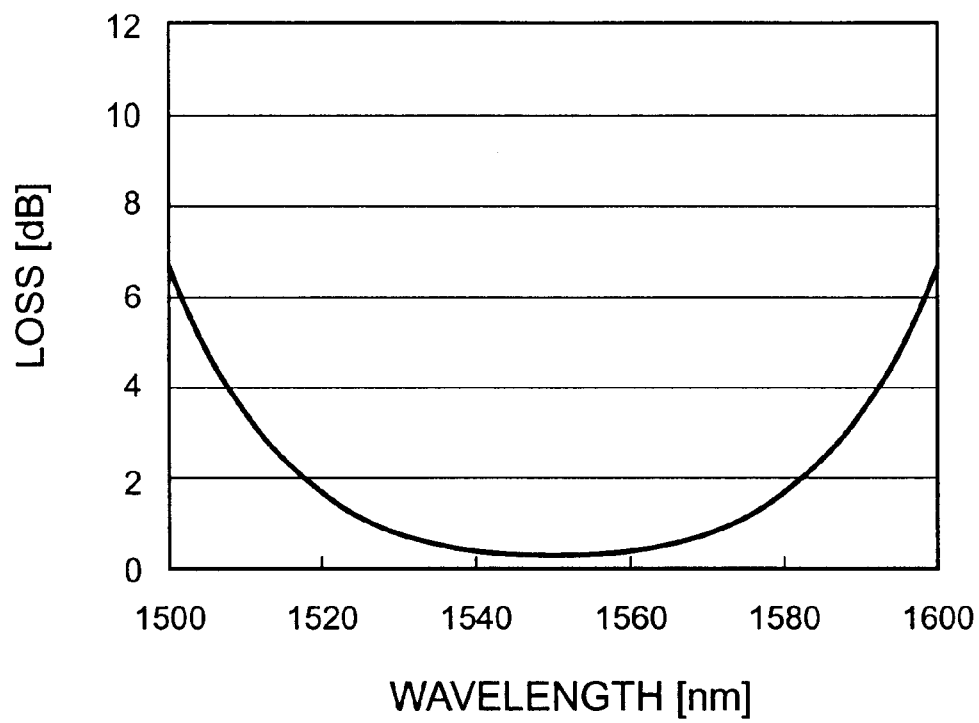
FIG. 6 is a graph showing a wavelength characteristic of transmission loss across the optical filter of FIG. 3.

FIG. 6 is a graph showing a wavelength characteristic of transmission loss across the optical filter 2 in accordance with this embodiment. Here, $C_1$=0.276, $C_2$=0.724, $C_3$=0.5, $n_c$=1.45, $\Delta L_1$=6.95 μm, $\Delta L_2$=16.57 μm, $\Delta\phi_1$=0°, and $\Delta\phi_2$=0°. In this case, the optical filter 2 exhibits a lower wavelength dependence of transmission loss near a wavelength of 1550 nm, and a lower loss over a wide wavelength range. Also, the width of wavelength band yielding a flat loss is broader than the bandwidth expectable from FIG. 4.

This can be explained as follows. As shown in FIG. 3, the electric field component $E_1$ of light outputted from the Mach-Zehnder interferometer 251 to the main optical path 210 is represented by the following expression:

$$E_1 = \sqrt{1-C(\lambda)} E_0 \quad (3)$$

where $E_0$ is the electric field component inputted to the Mach-Zehnder interferometer 251. On the other hand, the electric field component $E_2$ of light outputted from the Mach-Zehnder interferometer 251 to the auxiliary optical path 220 is represented by the following expression:

$$E_2 = \sqrt{C(\lambda)} E_0 exp[j\Delta\theta(\lambda)] \quad (4)$$

where $\theta(\lambda)$ is the phase difference between the electric field components $E_1$ and $E_2$, and depends on the wavelength $\lambda$. When the phase difference $\theta(\lambda)$ is designed appropriately, it can broaden the wavelength band yielding a flat transmission loss as shown in FIG. 6.

Figure 7A:
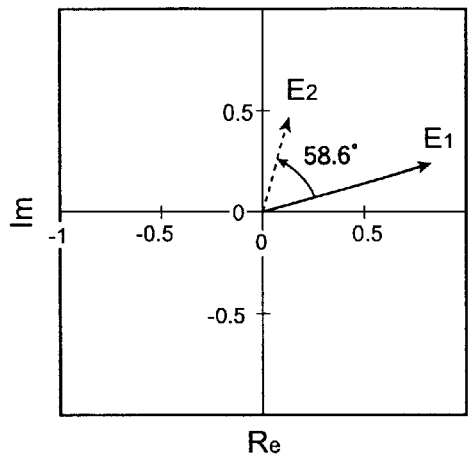
FIGS. 7A to 7C are charts showing each of electric field components $E_1$ and $E_2$ in the optical filter of FIG. 3 in terms of vector.
Figure 7B:
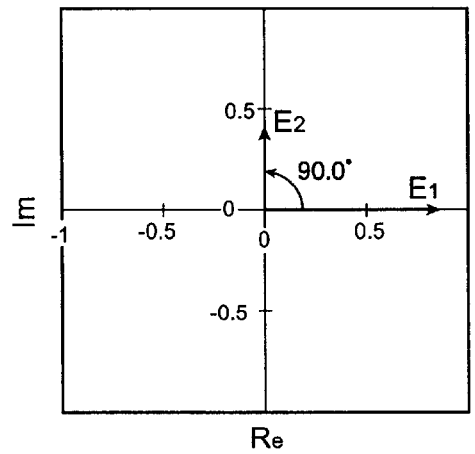
Figure 7C:
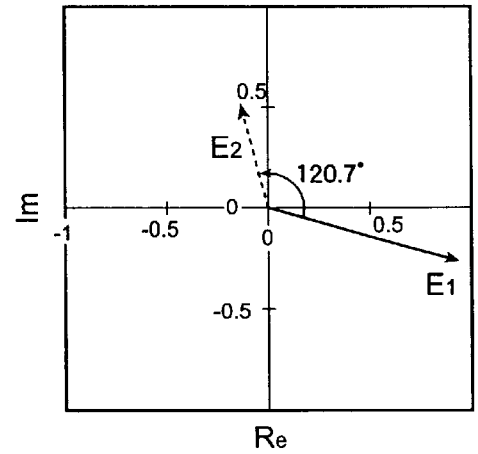

FIGS. 7A to 7C are charts showing each of electric field components $E_1$ and $E_2$ in terms of vector in the optical filter 2 in accordance with this embodiment. Here, $C_1$=0.276, $C_2$=0.724, $C_3$=0.5, $n_c$=1.45, $\Delta L_1$=6.95 μm, $\Delta L_2$=16.57 μm, $\Delta\phi_1$=0°, and $\Delta\phi_2$=0. FIG. 7A illustrates the case where the wavelength is 1530 nm, which yields a phase difference $\theta(\lambda)$ of 58.6°. FIG. 7B illustrates the case where the wavelength is 1550 nm, which yields a phase difference $\theta(\lambda)$ of 90.0°. FIG. 7C illustrates the case where the wavelength is 1570 nm, which yields a phase difference $\theta(\lambda)$ of 120.7°.

Thus, the phase difference $\theta(\lambda)$ between the respective electric field components $E_1$, $E_2$ outputted from the Mach-Zehnder interferometer 251 to the main optical path 210 and auxiliary optical path 220 has such a wavelength dependence that it monotonously increases as the wavelength $\lambda$ is longer. On the other hand, the phase difference between the main optical path 210 and auxiliary optical path 220 from the Mach-Zehnder interferometer 251 to the optical coupler 243 is represented by the expression of $(2\pi n_c/\lambda)\Delta L_2$, and monotonously decreases as the wavelength $\lambda$ is longer. Therefore, the phase difference between the electric field components $E_1$, $E_2$ at the time when they reach the optical coupler 243 has a lower wavelength dependence. As a consequence, the wavelength dependence of loss in the optical filter 2 decreases, which makes it possible to broaden the wavelength band yielding a flat transmission loss as shown in FIG. 6.

Figure 8:
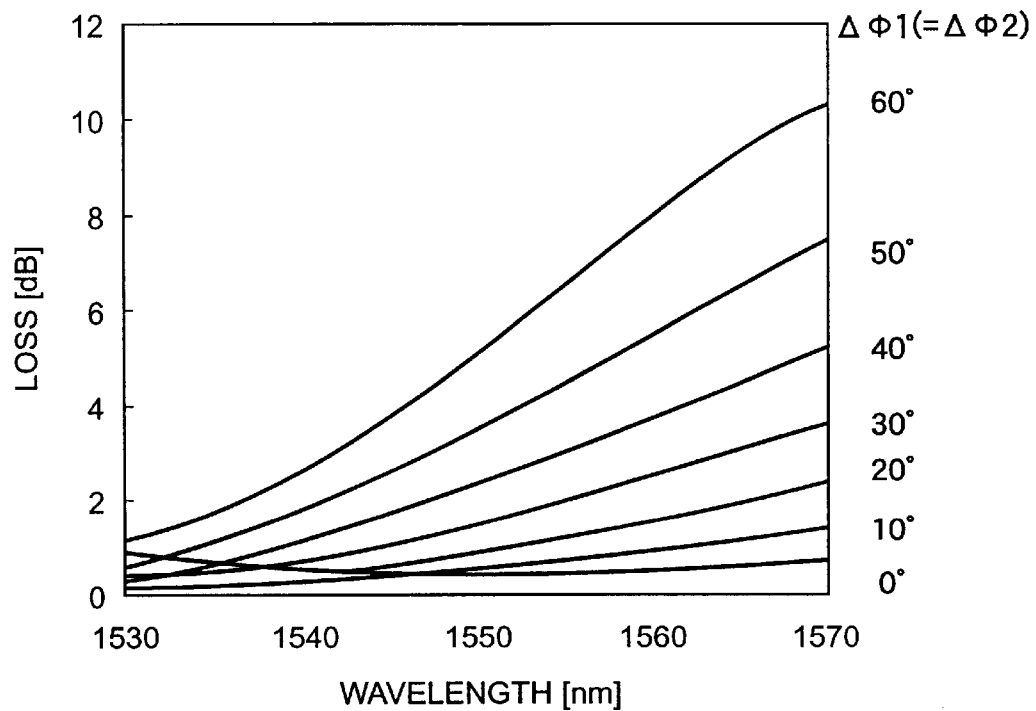
FIG. 8 is a graph showing wavelength characteristics of transmission loss across the optical filter of FIG. 3.

FIG. 8 is a graph showing wavelength characteristics of transmission loss across the optical filter 2 in accordance with this embodiment. Here, $C_1$=0.276, $C_2$=0.724, $C_3$=0.5, $n_c$=1.45, $\Delta L_1$=6.95 μm, and $\Delta L_2$=16.57 μm. Also, $\Delta\phi_1$=$\Delta\phi_2$, and they are set to each of 0°, 10°, 20°, 30°, 40°, 50°, and 60°.

As can be seen from this graph, when no temperature adjustment is effected by the heaters 231, 232, i.e., the phase shift amounts $\Delta\phi_1$, $\Delta\phi_2$ are 0°, the transmission loss across the optical filter 2 is minimized at a wavelength of 1550 nm and becomes a low value within the wavelength range from 1530 nm to 1570 nm, thus yielding a low slope of transmission loss with an excellent linearity with respect to the wavelength $\lambda$ in the above-mentioned wavelength range. Also, the slope of transmission loss to the wavelength $\lambda$ in the above-mentioned wavelength range increases as the phase shift amounts $\Delta\phi_1$, $\Delta\phi_2$ are enhanced by the temperature adjustment effected by the heaters 231, 232. Here, the transmission loss is minimized at a wavelength of 1535 nm on the shorter wavelength side.

The optical filter 2 has such characteristics that the loss slope is variable within the range from 0 to 7.8 dB/30 nm when the phase shift amounts $\Delta\phi_1$, $\Delta\phi_2$ are adjusted within the range from 0° to 60° within the wavelength range from 1535 nm to 1565 nm (with a bandwidth of 30 nm), the loss slope deviation from a given straight line is 0.63 dB or less, thereby yielding an excellent linearity, and the minimum value of transmission loss in the above-mentioned wavelength band is 1.71 dB.

Figure 9:
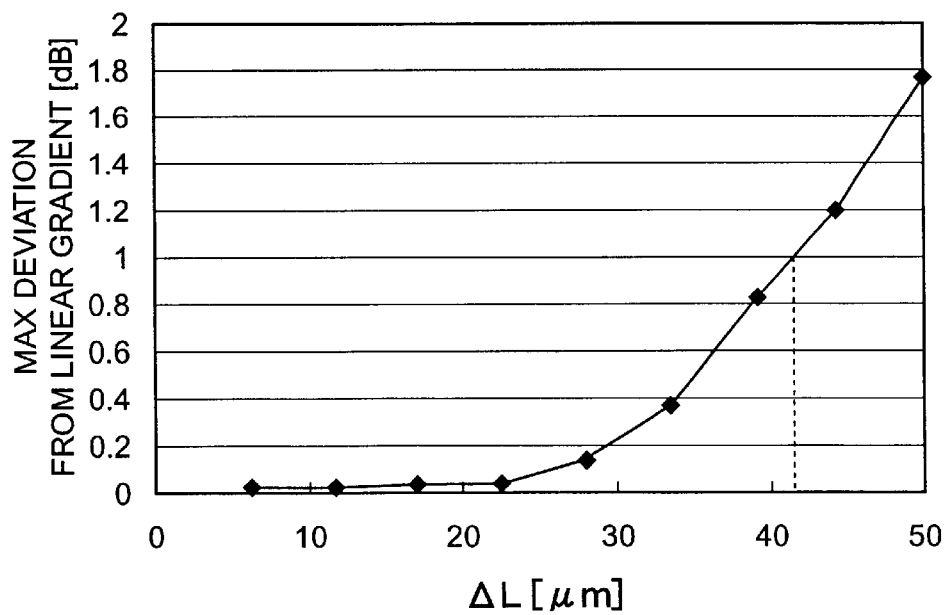
FIG. 9 is a graph showing the relationship between the loss slope deviation from a given straight line and the optical path length difference $\Delta L$ in the optical filter of FIG. 3.

FIG. 9 is a graph showing the relationship between the loss slope deviation from a given straight line and the optical path length difference $\Delta L$ in the optical filter 2 in accordance with this embodiment. Here, the optical path length difference $\Delta L$ represents the longer one of the optical path length difference $\Delta L_1$ between the main optical path 210 and auxiliary optical path 220 between the first optical coupler 241 and second optical coupler 242, and the optical path length difference $\Delta L_2$ between the main optical path 210 and auxiliary optical path 220 between the second optical coupler 242 and third optical coupler 243. As shown in this graph, the loss slope deviation from a given straight line is greater in the optical filter 2 as the optical path length difference $\Delta L$ is greater. When the value of optical path length difference $\Delta L$ is 42 μm or less, the loss slope deviation from a given straight line becomes 1 dB or less in the optical filter 2, which is favorable.

When Peltier devices are provided in place of the heaters 231, 232 in this embodiment so as to raise or lower the temperatures of main optical path 210 and auxiliary optical path 220, the values of phase shift amounts $\Delta\phi_1$, $\Delta\phi_2$ can be set not only positive but also negative. If the values of phase shift amounts $\Delta\phi_1$, $\Delta\phi_2$ are thus changed within the range from −60° to 0°, then the loss slope can be set within the range from −7.8 dB/30 nm to 0 dB/30 nm within the wavelength band from 1535 nm to 1565 nm, whereupon the transmission loss is minimized at a wavelength of 1565 nm on the longer wavelength side.

A heater or Peltier device may be disposed on the main optical path 210 instead of auxiliary optical path 220 between the optical couplers 241 and 242, or on the auxiliary optical path 220 instead of main optical path 210 between the optical couplers 242 and 243. Also, a heater or Peltier device may be disposed on each of the main optical path 210 and auxiliary optical path 220.

Figure 10:
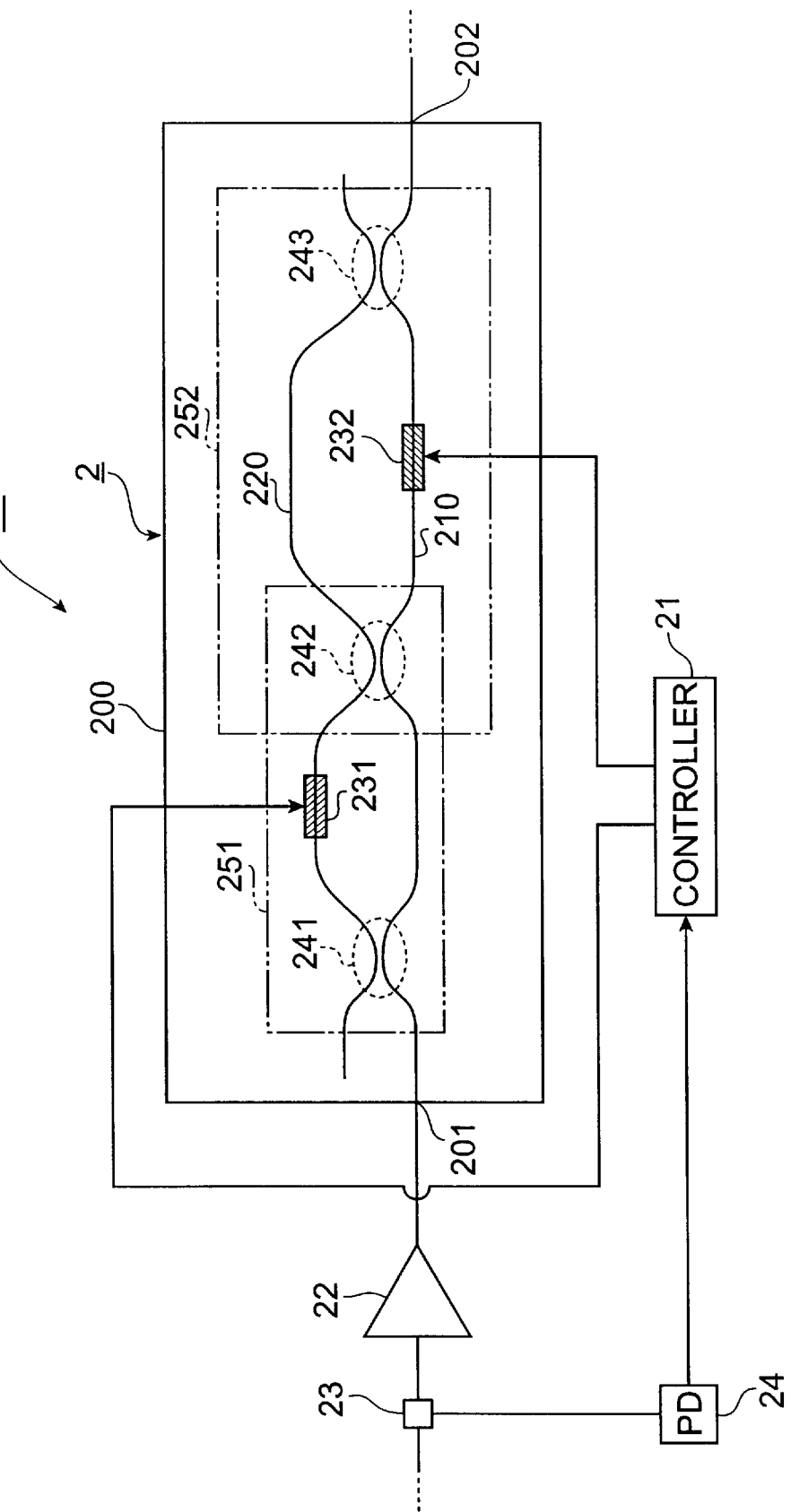
FIG. 10 is a diagram of an optical amplifier using the optical filter of FIG. 3 as a gain equalizer.

The optical filter 2 is suitably employable as a gain equalizer in an optical amplifier. FIG. 10 is a diagram of an optical amplifier 20 using the optical filter 2 in accordance with this embodiment as a gain equalizer. This optical amplifier 20 comprises a controller 21, an optical amplifier section 22, a branching section 23, and a light-receiving section 24 in addition to the optical filter 2 as a gain equalizer. The branching section 23 branches out a part of signal light fed into the optical amplifier 20, so as to output it toward the light-receiving section 24 and the rest toward the optical amplifier section 22. The light-receiving section 24 is a photodiode, for example, which receives the signal light reaching there from the branching section 23 and outputs an electric signal corresponding to the power of signal light fed into the optical amplifier 20. The optical amplifier section 22 has an amplifying optical waveguide (e.g., an optical fiber whose optical waveguide region is doped with Er element) and a pumping light source (e.g., semiconductor laser light source for outputting laser light having a wavelength of 1.48 μm as the pumping light). The optical amplifier section 22 optically amplifies the inputted signal light and outputs thus amplified signal.

The optical filter 2 as the gain equalizer has a loss slope set by the controller 21, and inputs the signal light outputted from the optical amplifier section 22 and carries out gain equalization. The controller 21 inputs the electric signal outputted from the light-receiving section 24 and monitors, according to the electric signal, the power of signal light fed into the optical amplifier 20. According to the input signal light power, the controller 21 controls the phase shift amount $\Delta\phi_1$ caused by the temperature adjustment of heater 231 and the phase shift amount $\Delta\phi_2$ caused by the temperature adjustment of heater 232 in relation to each other, thereby regulating the loss slope of optical filter 2. For example, when the optical filter 2 has the configuration explained in FIG. 8, the controller 21 controls the phase shift amounts $\Delta\phi_1$ and $\Delta\phi_2$ such that they equal each other.

Thus configured optical amplifier 20 operates as follows. Namely, the gain in optical amplification of signal light in the optical amplifier section 22 is changed in order to maintain a constant power of signal light outputted from the optical amplifier 20 when the loss in the optical transmission line fluctuates for some reason and thereby the power of signal light fed into the optical amplifier 20 fluctuates. When the gain is changed, the wavelength dependence of gain in the optical amplifier section 22, i.e., gain slope, fluctuates, thereby deteriorating the gain flatness of optical amplifier section 22. However, by using the optical filter 2 in accordance with this embodiment as a gain equalizer in the optical amplifier 20 and adjusting the values of phase shift amounts $\Delta\phi_1$, $\Delta\phi_2$ of optical filter 2, i.e., value of transmission loss slope, the fluctuation in gain slope of the optical amplifier section 22 accompanying the fluctuation in input signal light power can be compensated for with the loss slope of optical filter 2.

Here, even when the loss slope of optical filter 2 is altered, the loss in the signal light wavelength band is low, whereby the signal light outputted from the optical amplifier 20 would not deteriorate its S/N ratio. When the signal light wavelength band and/or center wavelength are set as mentioned above, in particular, the optical filter 2 in accordance with this embodiment can favorably be used as a gain equalizer for equalizing the gain characteristic of the optical amplifier 20 disposed in a repeater station or the like in an optical transmission system for transmitting signal light of a plurality of channels in a wavelength band of 1.55 μm or 1.59 μm. As in the foregoing, it will be sufficient if only two pieces of heaters or Peltier devices are provided as temperature adjusting means, whereby the loss slope is easy to control, and the optical filter 2 in accordance with this embodiment is suitably employable as a gain equalizer or the like in the optical amplifier.

Second Embodiment

Figure 11:
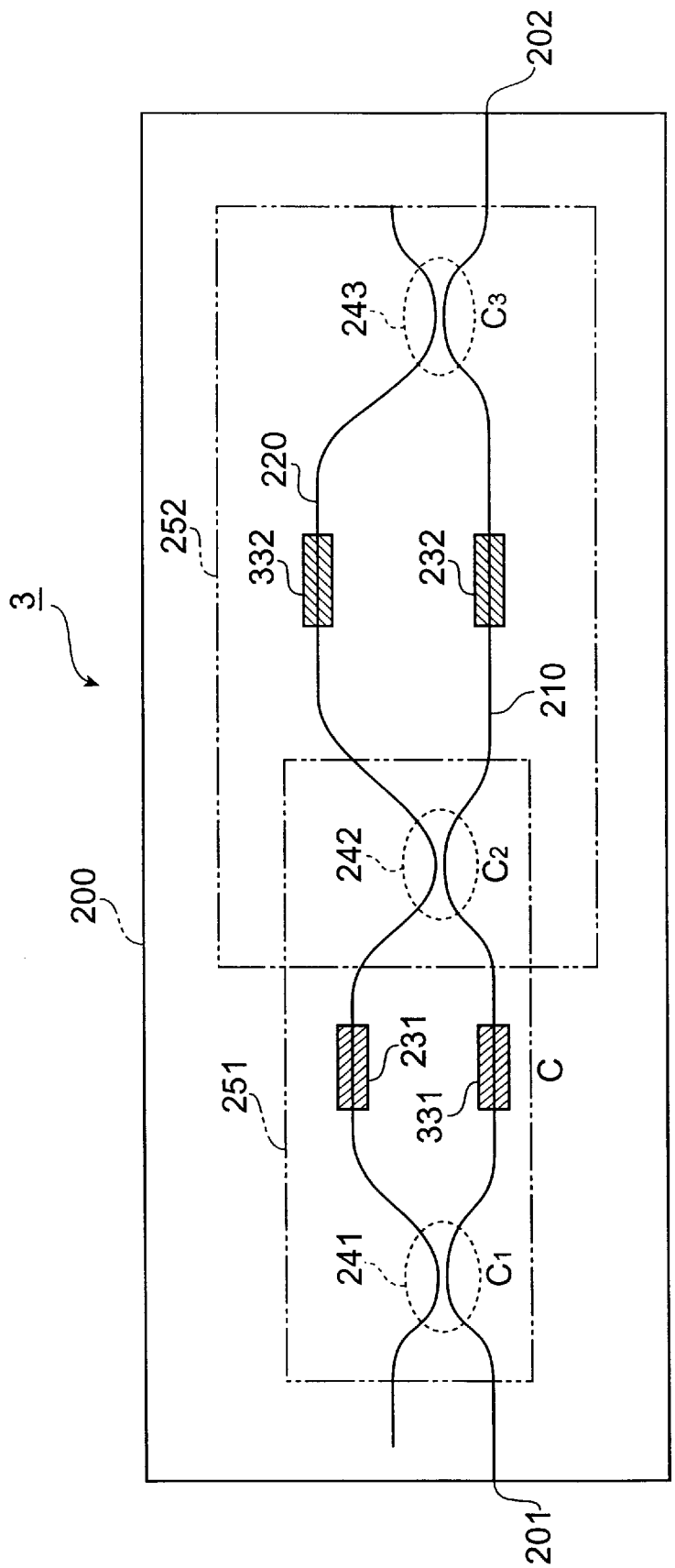
FIG. 11 is a diagram of a second embodiment of the optical filter in accordance with the present invention.

A second embodiment of the optical filter in accordance with the present invention will now be explained. FIG. 11 is a diagram showing an optical filter 3 in accordance with the second embodiment. The optical filter 3 in accordance with this embodiment further comprises heaters 331 and 332 in addition to the configuration of the optical filter 2 in accordance with the first embodiment.

The heater 231 is disposed on the auxiliary optical path 220 between the first optical coupler 241 and the second optical coupler 242, and adjusts the temperature of auxiliary optical path 220, thereby regulating the phase shift amount $\Delta\phi_1$ of auxiliary optical path 220 therebetween. The heater 232 is disposed on the main optical path 210 between the second optical coupler 242 and the third optical coupler 243, and adjusts the temperature of main optical path 210, thereby regulating the phase shift amount $\Delta\phi_2$ of main optical path 210 therebetween. The heater 331 is disposed on the main optical path 210 between the first optical coupler 241 and the second optical coupler 242, and adjusts the temperature of main optical path 210, thereby regulating the phase shift amount $\Delta\phi_3$ of main optical path 210 therebetween. The heater 332 is disposed on the auxiliary optical path 220 between the second optical coupler 242 and the third optical coupler 243, and adjusts the temperature of auxiliary optical path 220, thereby regulating the phase shift amount $\Delta\phi_4$ of auxiliary optical path 220 therebetween. Thus, the heaters 231, 232, 331, and 332 adjust the transmission loss between the light input end 201 and light output end 202.

Figure 12:
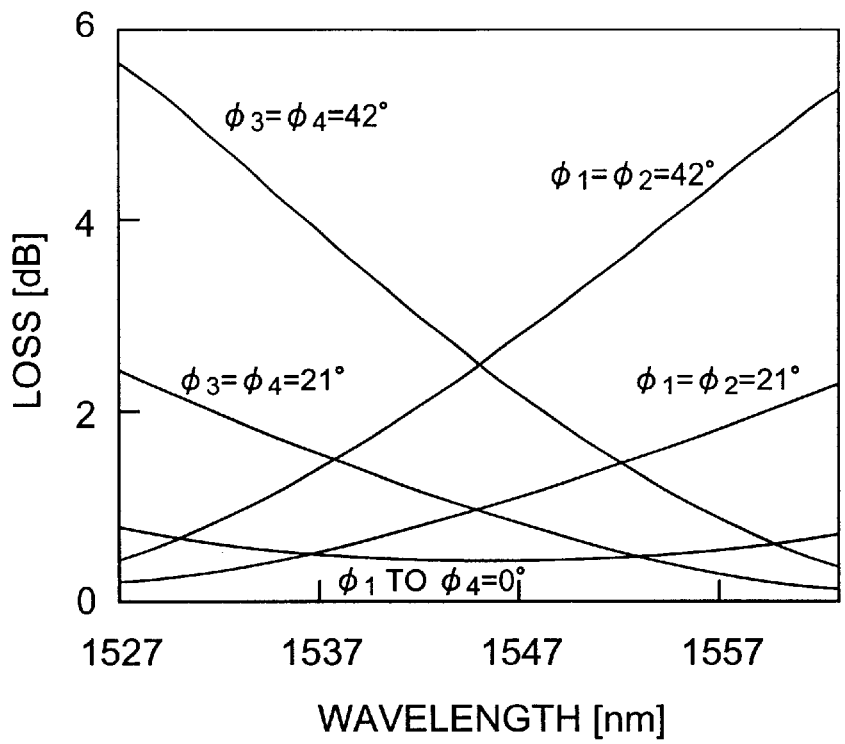
FIG. 12 to FIG. 14 are graphs showing wavelength characteristics of transmission loss across the optical filter of FIG. 11.

FIG. 12 is a graph showing wavelength characteristics of loss in the optical filter 3 in accordance with the second embodiment. Here, as in the case of FIG. 8 in the first embodiment, $C_1=0.276$, $C_2=0.724$, $C_3=0.5$, $n_c=1.45$, $\Delta L_1 6.95$ μm, and $\Delta L_2=16.57$ μm. Also, $\Delta\phi_1=\Delta\phi_2=21°$ or $42°$ and $\Delta\phi_3=\Delta\phi_4=0°$, or $\Delta\phi_1=\Delta\phi_2=0°$ and $\Delta\phi_3=\Delta\phi_4=21°$ or $42°$.

As can be seen from this graph, when no temperature adjustment is effected by the heaters 231, 232, 331, 332, i.e., all the phase shift amounts $\Delta\phi_1$ to $\Delta\phi_4$ are 0°, the transmission loss across the optical filter 3 is minimized near a wavelength of 1545 nm and becomes a low value within the wavelength range from 1527 nm to 1563 nm, thus yielding a low slope of transmission loss with an excellent linearity with respect to the wavelength λ in the above-mentioned wavelength range.

The slope of transmission loss to the wavelength λ in the above-mentioned wavelength range increases as the phase shift amounts $\Delta\phi_1$, $\Delta\phi_2$ are enhanced by the temperature adjustment effected by the heaters 231, 232 while keeping the phase shift amount $\Delta\phi_3=\Delta\phi_4=0°$ with no temperature adjustment effected by the heaters 331, 332. Here, the transmission loss is minimized at a wavelength of 1527 nm on the shorter wavelength side.

On the other hand, the slope of transmission loss to the wavelength λ in the above-mentioned wavelength range increases as the phase shift amounts $\Delta\phi_3$, $\Delta\phi_4$ are enhanced by the temperature adjustment effected by the heaters 331, 332 while keeping the phase shift amount $\Delta\phi_1=\Delta\phi_2=0°$ with no temperature adjustment effected by the heaters 231, 232. Here, the loss is minimized at a wavelength of 1563 nm on the longer wavelength side.

The optical filter 3 has such characteristics that, within the wavelength range from 1527 nm to 1563 nm (with a bandwidth of 36 nm), the loss slope is variable within the range from 0 to 5.06 dB/36 nm when the phase shift amounts $\Delta\phi_1$, $\Delta\phi_2$ are adjusted within the range from 0° to 42° and is variable within the range from 0 to -5.33 dB/36 nm when the phase shift amounts $\Delta\phi_3$, $\Delta\phi_4$ are adjusted within the range from 0° to 42°, the loss slope deviation from a given straight line is 0.55 dB or less, thereby yielding an excellent linearity, and the minimum value of transmission loss in the above-mentioned wavelength band is 0.40 dB or less.

Figure 13:
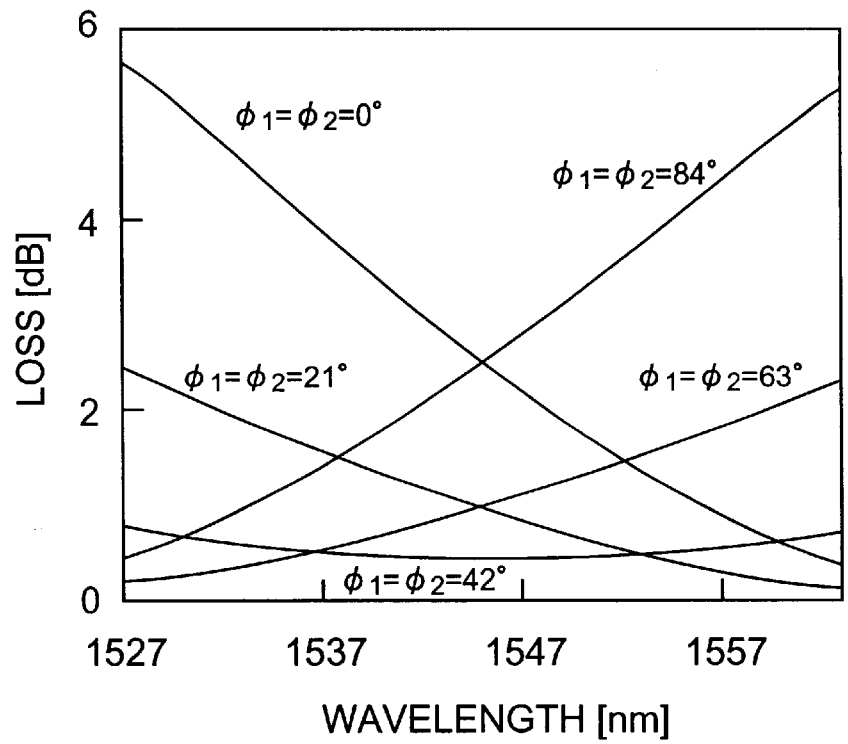

FIG. 13 is also a graph showing wavelength characteristics of transmission loss across the optical filter 3 in accordance with the second embodiment. Here, differing from the case with FIG. 12, $\Delta L_1=6.82$ μm, and $\Delta L_2=16.70$ μm. Also, while $\Delta\phi_3=\Delta\phi_4=0°$, $\Delta\phi_1=\Delta\phi_2=0°$, 21°, 43°, 63°, and 84°. The wavelength dependence of transmission loss shown in this drawing is similar to that shown in FIG. 12. However, while the values of phase shift amounts $\Delta\phi_1$ and $\Delta\phi_2$ are adjusted so as to regulate the loss slope in a positive range whereas the values of phase shift amounts $\Delta\phi_3$ and $\Delta\phi_4$ are adjusted so as to regulate the loss slope in a negative range in the characteristics shown in FIG. 12, the loss slope can be regulated in both positive and negative ranges by adjusting only the two kinds of phase shift amounts $\Delta\phi_1$ and $\Delta\phi_2$ in those shown in FIG. 13.

The difference between the respective operations in FIGS. 12 and 13 mentioned above is caused by the following difference in design. Namely, in the relational expression of $$n_c \cdot \Delta L = m \cdot \lambda_0 \quad (5)$$

among the effective refractive index $n_c$, optical path length difference $\Delta L$, and center wavelength $\lambda_0$, the respective values of optical path length differences $\Delta L_1$ and $\Delta L_2$ and effective refractive index $n_c$ are set appropriately. Here, if the value of parameter m is designed so as to become an integer or an integer +½, then the absolute value of loss slope of optical filter 3 can be minimized when all the phase shift amounts $\Delta\phi_1$ to $\Delta\phi_4$ are 0° as shown in FIG. 12. In FIG. 12, m1=6.50 in the Mach-Zehnder interferometer 251, whereas m2=15.50 in the Mach-Zehnder interferometer 252. If the value of parameter m is designed so as to attain a value other than those mentioned above, on the other hand, then the optical filter 3 can have an initial slope when all the phase shift amounts $\Delta\phi_1$ to $\Delta\phi_4$ are 0° as shown in FIG. 13. In FIG. 13, m1=6.38 in the Mach-Zehnder interferometer 251, whereas m2=15.62 in the Mach-Zehnder interferometer 252.

When the respective values of optical path length differences $\Delta L_1$ and $\Delta L_2$ and effective refractive index $n_c$ are set appropriately as in the foregoing, the loss slope can be regulated within both positive and negative ranges by adjusting two kinds of values of phase shift amounts $\Delta\phi_1$ and $\Delta\phi_2$ alone as in the case of FIG. 13. Here, control is easier than that in the case shown in FIG. 12 in which four kinds of values of phase shift amounts $\Delta\phi_1$ to $\Delta\phi_4$ are regulated. Even when the respective values of optical path length differences $\Delta L_1$ and $\Delta L_2$ and effective refractive index $n_c$ are set appropriately, however, each value is not always at its designed value in the final product. Therefore, the optical filter 3 comprises the heaters 331 and 332, whose temperature adjustment regulates the optical path length differences $\Delta L_1$ and $\Delta L_2$ such that they attain their designed values.

Figure 14:
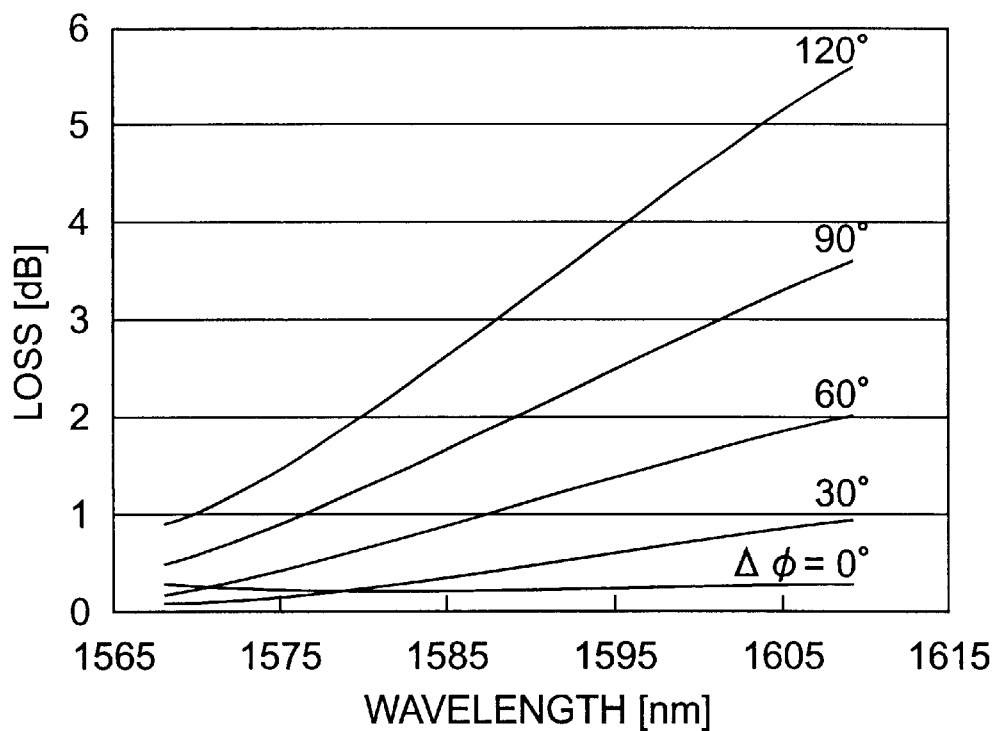

FIG. 14 is another graph showing wavelength characteristics of transmission loss across the optical filter 3 in accordance with the second embodiment. Here, differing from the cases with FIG. 12 and FIG. 13, $C_1=0.04$, $C_2=0.22$, $C_3=0.25$, $\Delta L_1=6.03$ μm, and $\Delta L_2=9.31$ μm. Also, while $\Delta\phi_2=\Delta\phi_3=\Delta\phi_4=0°$, $\Delta\phi_1=0°$, 30°, 60°, 90°, and 120°.

As can be seen from this graph, the optical filter 3 has characteristics that, within the wavelength range from 1570 nm to 1610 nm (with a bandwidth of 40 nm), the loss slope is variable within the range from 0 to 5 dB/40 nm when the phase shift amounts $\Delta_1$ is adjusted within the range from 0° to 120°, and the minimum value of transmission loss in the above-mentioned wavelength band is 0.25 dB or less.

Figure 15:
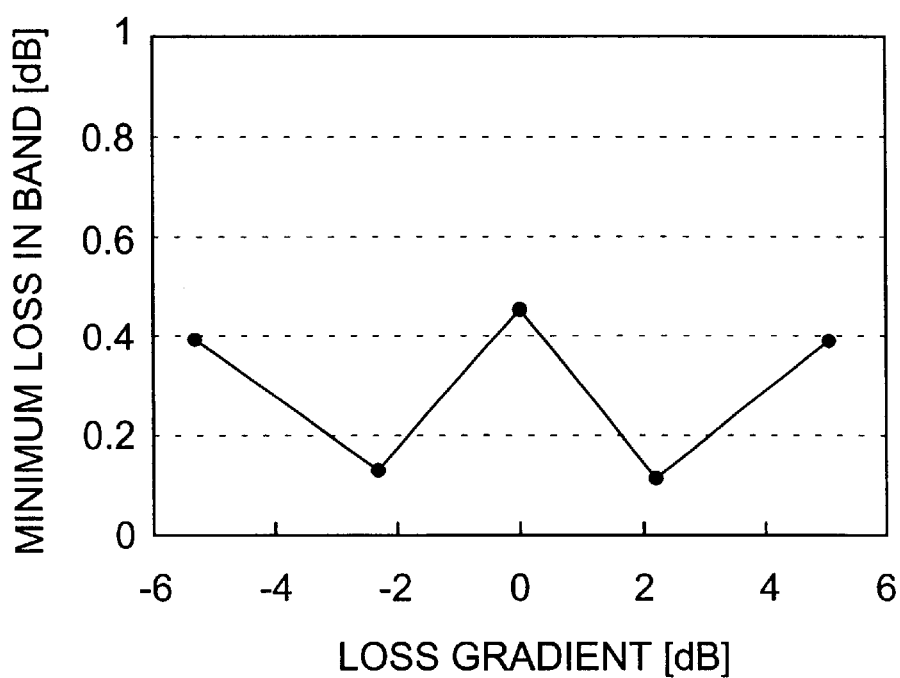
FIG. 15 is a graph showing the relationship between the minimum loss of the optical filter of FIG. 11 within a band and its loss slope.

FIG. 15 is a graph showing the relationship between the minimum loss of the optical filter 3 in accordance with the second embodiment in a band and the loss slope thereof. Here, as in the case with FIG. 13, $C_1=0.276$, $C_2=0.724$, $C_3=0.5$, $n_c=1.45$, $\Delta L_1=6.82$ μm, and $\Delta L_2=16.70$ μm. As can be seen from this graph, the minimum transmission loss is 0.5 dB or less within the wavelength band from 1527 nm to 1563 nm even when the loss slope is changed within the range of ±5 dB/36 nm.

Figure 16:
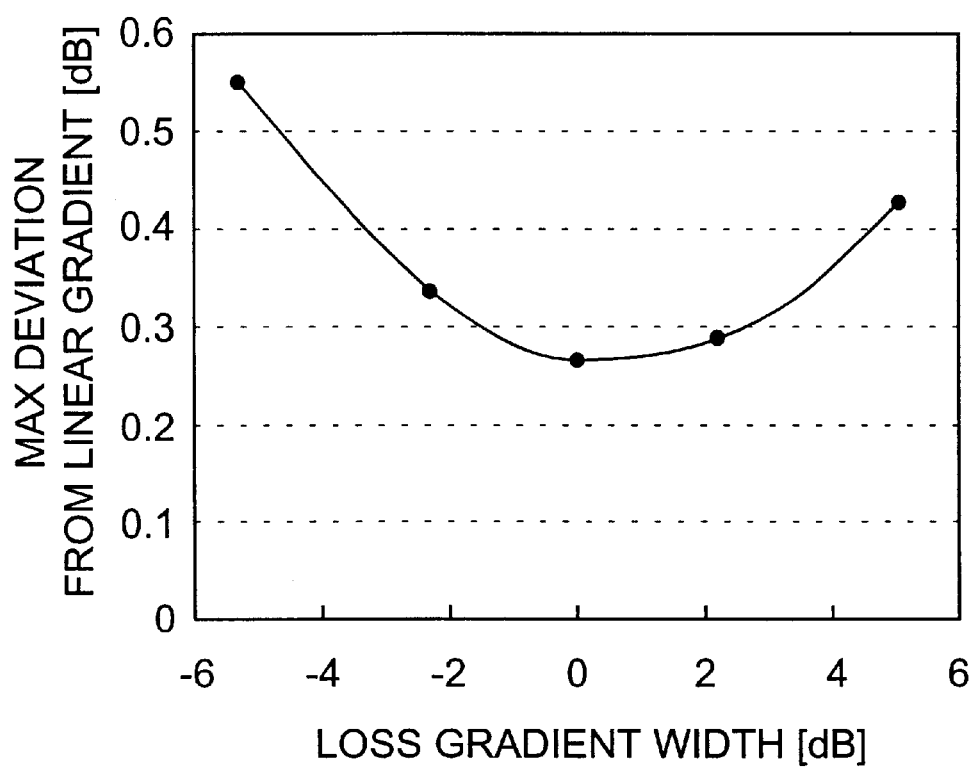
FIG. 16 is a graph showing the relationship between the loss slope deviation from a given straight line and the loss slope width in the optical filter of FIG. 11.

FIG. 16 is a graph showing the relationship between the loss slope deviation from a given straight line and the loss slope width in the optical filter 3 in accordance with the second embodiment. Here, as in the case with FIG. 13, $C_1=0.276$, $C_2=0.724$, $C_3=0.5$, $n_c=1.45$, $\Delta L_1=6.82$ μm, and $\Delta L_2=16.70$ μm. The loss slope width is the difference between the maximum and minimum losses within the wavelength band from 1527 nm to 1563 nm. As can be seen from this graph, the loss slope deviation from a given straight line is 0.6 dB or less even when the loss slope is changed, whereby its linearity is excellent.

Figure 17:
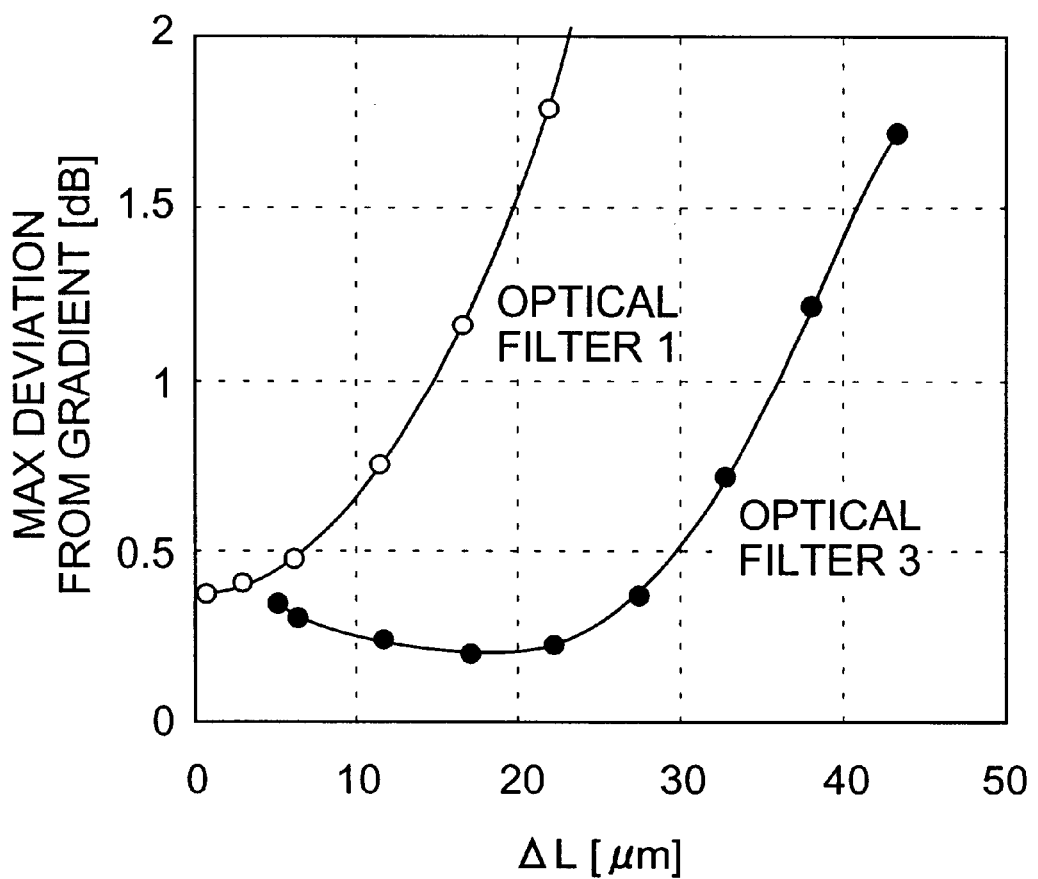
FIG. 17 is a graph showing the relationship between the loss slope deviation from a given straight line and the optical path length difference $\Delta L$ in the optical filter of FIG. 11.

FIG. 17 is a graph showing the relationship between the loss slope deviation from a given straight line and the optical path length difference $\Delta L$ in the optical filter 3 in accordance with the second embodiment. Here, as in the case with FIG. 13, $C_1=0.276$, $C_2=0.724$, $C_3=0.5$, $n_c=1.45$, $\Delta L_1=6.82$ μm, and $\Delta L_2=16.70$ μm. This graph also shows the optical filter 1 in accordance with the basic embodiment. In order for the loss slope deviation from a given straight line to become 1 dB or less, as can be seen from this graph, it is necessary for the optical filter 3 in accordance with the second embodiment to have an optical path length difference $\Delta L$ of 36 μm or less, and it is necessary for the optical filter 1 in accordance with the basic embodiment to have an optical path length difference $\Delta L$ of 15 μm or less. The deviation is 0.20 dB in the optical filter 3 in accordance with the second embodiment when the optical path length difference $\Delta L$ is 16.6 μm, whereas the deviation is 0.38 dB in the optical filter 1 in accordance with the basic embodiment when the optical path length difference $\Delta L$ is 0.53 μm.

Figure 18:
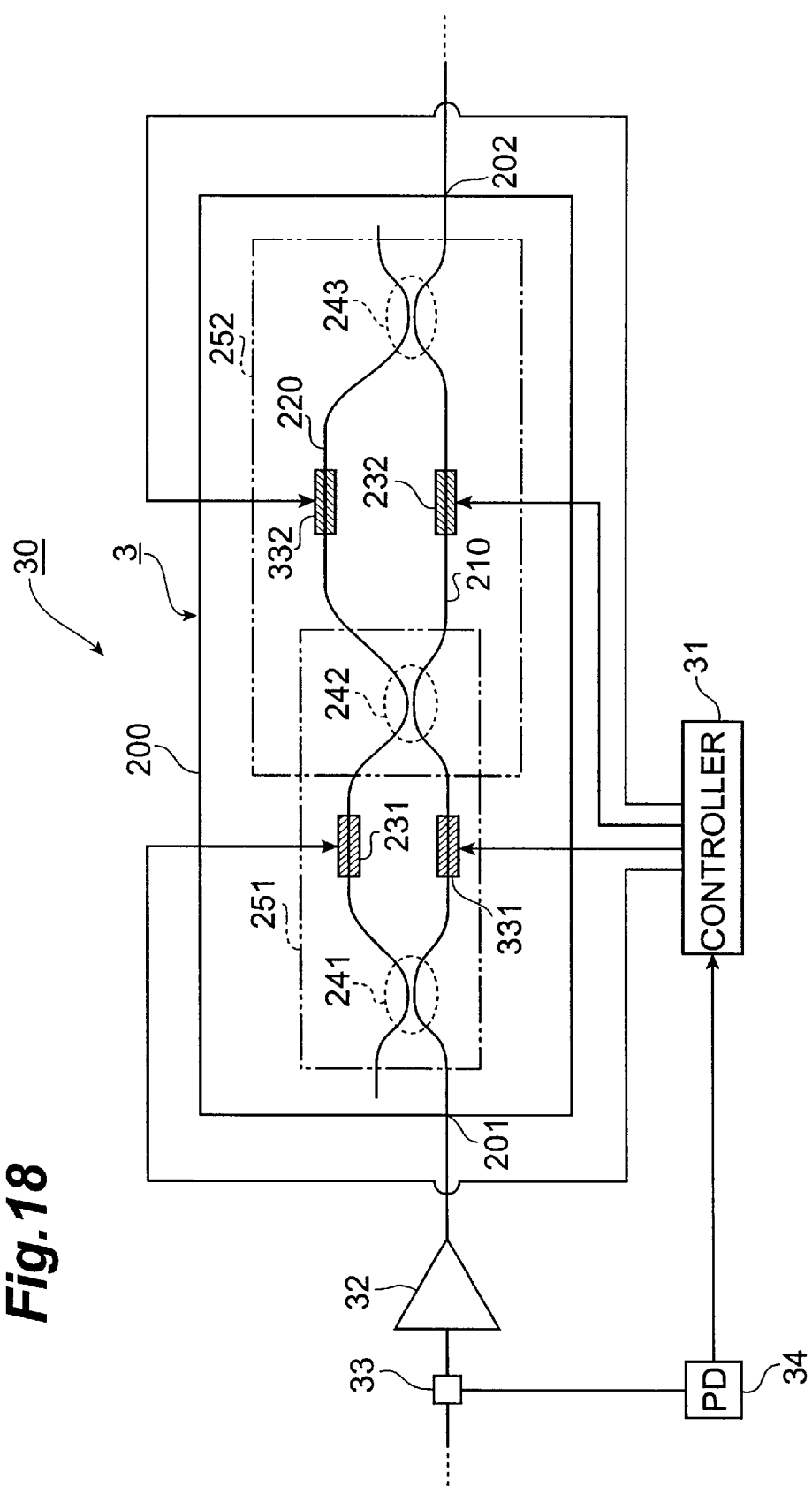
FIG. 18 is a diagram of an optical amplifier using the optical filter of FIG. 11 as a gain equalizer.

The optical filter 3 in accordance with this embodiment is suitably employable as a gain equalizer in an optical amplifier. FIG. 18 is a diagram of an optical amplifier 30 using the optical filter 3 in accordance with the second embodiment as a gain equalizer. This optical amplifier 30 comprises a controller 31, an optical amplifier section 32, a branching section 33, and a light-receiving section 34 in addition to the optical filter 3 as a gain equalizer. The branching section 33 branches out a part of signal light fed into the optical amplifier 30, so as to output it toward the light-receiving section 34 and the rest toward the optical amplifier section 32. The light-receiving section 34 is a photodiode, for example, which receives the signal light reaching there from the branching section 33 and outputs an electric signal corresponding to the power of signal light fed into the optical amplifier 30. The optical amplifier section 32 has an amplifying optical waveguide (e.g., an optical fiber whose optical waveguide region is doped with Er element) and a pumping light source (e.g., semiconductor laser light source for outputting laser light having a wavelength of 1.48 μm as the pumping light). The optical amplifier section 32 optically amplifies the inputted signal light and outputs thus amplified signal.

The optical filter 3 as a gain equalizer has a predetermined loss slope in which the phase shift amounts $\Delta\phi_3$ and $\Delta\phi_4$ are appropriately adjusted and initially set according to the temperature adjustment by each of the heaters 331 and 332 under the control of the controller 31, and inputs the signal light outputted from the optical amplifier section 32, thereby carrying out gain equalization. The controller 31 inputs the electric signal outputted from the light-receiving section 34 and monitors, according to the electric signal, the power of signal light fed into the optical amplifier 30. Then, according to the input signal power, the controller 31 controls the phase shift amount $\Delta\phi_1$ caused by the temperature adjustment by the heater 231 and the phase shift amount $\Delta\phi_2$ caused by the temperature adjustment by the heater 232 in relation to each other, thereby regulating the loss slope of optical filter 3. When the optical filter 3 has the configuration explained with FIG. 11, for example, the controller 31 controls the phase shift amounts $\Delta\phi_1$, $\Delta\phi_2$ such that they equal each other.

Thus configured optical amplifier 30 operates as follows. Namely, the gain in optical amplification of signal light in the optical amplifier section 32 is changed in order to maintain a constant power of signal light outputted from the optical amplifier 30 when the transmission loss in the optical transmission line fluctuates for some reason and thereby the power of signal light fed into the optical amplifier 30 fluctuates. When the gain is changed, the wavelength dependence of gain in the optical amplifier section 32, i.e., gain slope, fluctuates, thereby deteriorating the gain flatness of optical amplifier section 32. However, by using the optical filter 3 in accordance with this embodiment as a gain equalizer in the optical amplifier 30 and adjusting the values of phase shift amounts $\Delta\phi_1$, $\Delta\phi_2$ of optical filter 3, i.e., value of transmission loss slope, the fluctuation in gain slope of the optical amplifier section 32 accompanying the fluctuation in input signal light power can be compensated for with the loss slope of optical filter 3.

Here, even when the loss slope of optical filter 3 is altered, the loss in the signal light wavelength band is low, whereby the signal light outputted from the optical amplifier 30 would not deteriorate its S/N ratio. When the signal light wavelength band and center thickness are set as mentioned above, in particular, the optical filter 3 in accordance with this embodiment can favorably be used as a gain equalizer for equalizing the gain characteristic of the optical amplifier 30 disposed in a repeater station or the like in an optical transmission system for transmitting signal light of a plurality of channels in a wavelength band of 1.55 μm or 1.59 μm. As in the foregoing, it will be sufficient if only two pieces of heaters or Peltier devices are provided as temperature adjusting means, whereby the loss slope is easy to control, and the optical filter 3 in accordance with this embodiment is suitably employable as a gain equalizer or the like in the optical amplifier.

Without being restricted to the above-mentioned embodiments, the present invention can be modified in various manners. The optical filters in the above-mentioned embodiments, in which individual constituents are formed on a substrate so as to be integrated, are favorable in that their handling is easy. However, the optical filter in accordance with the present invention may be configured such that each of the main and auxiliary optical paths is made of an optical fiber, whereas each optical coupler is made of an optical coupler. This case is preferable in that the increment of the transmission loss at the time of disposing the optical filter on the optical fiber transmission line is low.

The operating wavelength band of optical filter can be set arbitrarily. The operating wavelength band can be set when the respective values of optical path length differences $\Delta L_1$ and $\Delta L_2$ are set appropriately according to the above-mentioned expression (5).

What is claimed is:

1. An optical filter comprising:

a main optical path for guiding light from an input end to an output end;

an auxiliary optical path, optically coupled to said main optical path with three optical couplers composed of first, second, and third optical couplers, wherein the optical path length between said first and second optical couplers and an optical path length between said second and third optical couplers are different from said main optical path;

two asymmetrical Mach-Zehnder interferometers combined with said three optical couplers and sharing said second optical coupler;

first temperature adjusting means, disposed in at least one of said main and auxiliary optical paths between said first and second optical couplers, for adjusting the temperature of said main and/or auxiliary optical paths;

second temperature adjusting means, disposed in at least one of said main and auxiliary optical paths between said second and third optical couplers, for adjusting the temperature of said main and/or auxiliary optical paths; and control means for controlling said first and second temperature adjusting means so as to set a slope of transmission loss across said main optical path to wavelength in a given wavelength band.

2. An optical filter according to claim 1, wherein between said first and second optical couplers and between said second and third optical couplers, the optical path length differences between said main and auxiliary optical paths are not longer than 42 μm.

3. An optical filter according to claim 1, wherein the transmission loss characteristics across said main optical path is substantially independent of wavelength in a given wavelength band by adjusting said first and second temperature adjusting means.

4. An optical filter according to claim 1, wherein the bandwidth of said given wavelength band is 25 nm or wider, the absolute value of the slope of transmission loss across said main optical path to wavelength in said given wavelength is variable at least within the range of 0 to 5 dB/25 nm, a deviation from a given straight line is 1 dB or less, and the minimum value of the transmission loss across said main optical path in said given wavelength band is 2 dB or less.

5. An optical filter according to claim 2, wherein the bandwidth of said given wavelength band is 36 nm or wider, the absolute value of the slope of transmission loss across said main optical path to wavelength in said given wavelength is variable at least within the range of 0 to 5 dB/36 nm, a deviation from a given straight line is 1 dB or less, and the minimum value of the transmission loss across said main optical path in said given wavelength band is 2 dB or less.

* * * * *